THIN FILM MAGNETIC MEMORY HAVING NONDESTRUCTIVE READOUT

Filed Nov. 3, 1961 2 Sheets-Sheet 1

INVENTOR.
ANDRE M. RENARD

BY HIS ATTORNEYS
HARRIS, KIECH, RUSSELL & KERN

THIN FILM MAGNETIC MEMORY HAVING NONDESTRUCTIVE READOUT

Filed Nov. 3, 1961 2 Sheets-Sheet 2

INTERROGATE CONDUCTORS-$I_I$

TRANSVERSE FIELD CONDUCTORS-$I_T$

SENSE CONDUCTORS-$E_O$

WRITE CONDUCTORS-$I_W$

INVENTOR.
ANDRE M. RENARD
BY HIS ATTORNEYS
HARRIS, KIECH, RUSSELL & KERN

United States Patent Office 3,293,620

Patented Dec. 20, 1966

3,293,620

THIN FILM MAGNETIC MEMORY HAVING NONDESTRUCTIVE READOUT

Andre M. Renard, Costa Mesa, Calif., assignor to Ford Motor Company, Dearborn, Mich., a corporation of Delaware Filed Nov. 3, 1961, Ser. No. 150,029
11 Claims. (Cl. 340—174)

This invention relates to magnetic memories and, in particular, to memories utilizing thin films of magnetic material and to methods of writing information into and reading information from such magnetic films.

Various attempts have been made to utilize magnetic films in memories for the storage of data. The various devices developed to date suffer a number of disadvantages which have prevented their use commercially. Some require two or more film spots or zones for each data bit; some do not provide nondestructive readout; some have severe limitations on operating speed and/or input and output currents and voltages. It is therefore an object of the present invention to provide a new and improved memory utilizing magnetic film as the storage medium which overcomes the disadvantages of the previously known memories. A specific object is to provide a memory requiring only a single film spot per data bit while providing nondestructive reading and extremely high operating rates. Memories built according to the present invention are now being operated at a readout rate of fifty megacycles per second and higher.

*Summary*

The present invention contemplates the use of a small spot or zone of anisotropic magnetic material, means for writing a binary one or zero into the material, means for generating a magnetic field oriented substantially perpendicular to the easy axis of magnetization of the material to produce a resultant field having an orientation which is a function of the stored information, means for interrogating the memory by inducing another magnetic field which produces rotation only in a central domain of the material, and means for generating an output voltage which varies as a function of this central domain rotation.

According to one aspect of the invention a memory element comprises a thin film of magnetic material having an easy axis of magnetization, means for generating a transverse magnetic field oriented substantially perpendicular to the easy axis with the transverse magnetic field of a magnitude to rotate the resultant field in the film to a position intermediate the easy axis and the transverse magnetic field axis, a conductor crossing over the film, means for generating a current pulse in the conductor of a magnitude to produce rotation of the magnetic field only in a central transverse portion of the film to provide a first domain of one orientation in the portion while leaving the remaining domains of the film unaffected with the remaining domains growing on termination of the pulse to eliminate the first domain, and means for generating a voltage varying as a function of magnetic field change in the film. In such a memory element information may be stored by various writing techniques which produce magnetization of a predetermined polarity along the easy axis of the material.

In such a memory element the conductors for carrying the various currents to produce the desired magnetic field may be positioned directly over and/or under the film resulting in a very thin, laminated structure. A memory system may utilize a plurality of spots of magnetic material arranged in a matrix on a substrate. The conductors may also be deposited in sheets positioned on the substrate sandwich style to provide a complete memory system.

The invention provides a method of nondestructive reading of information from a magnetic film having an easy axis of magnetization and two possible residual magnetization states which represent a binary zero and one, respectively. The method includes the steps of generating a first magnetic field substantially perpendicular to the easy axis to produce a resultant field rotated away from the easy axis, during the existence of the first magnetic field generating a second magnetic field only in a portion of the film producing a temporary magnetic domain in the portion rotated away from the resultant field with the temporary domain decaying on termination of the second magnetic field, and generating an output voltage varying as a function of field change in the film produced by the second magnetic field. Such a method also includes the step of inducing a residual magnetic flux field of predetermined polarity along the easy axis of magnetization of the film to store a binary bit of information in the film.

Other objects, advantages, features and results of the invention will more fully appear in the course of the following description. The drawings merely show and the description merely describes preferred embodiments of the present invention which are given by way of illustration or example.

Figures 1, 2, 6:
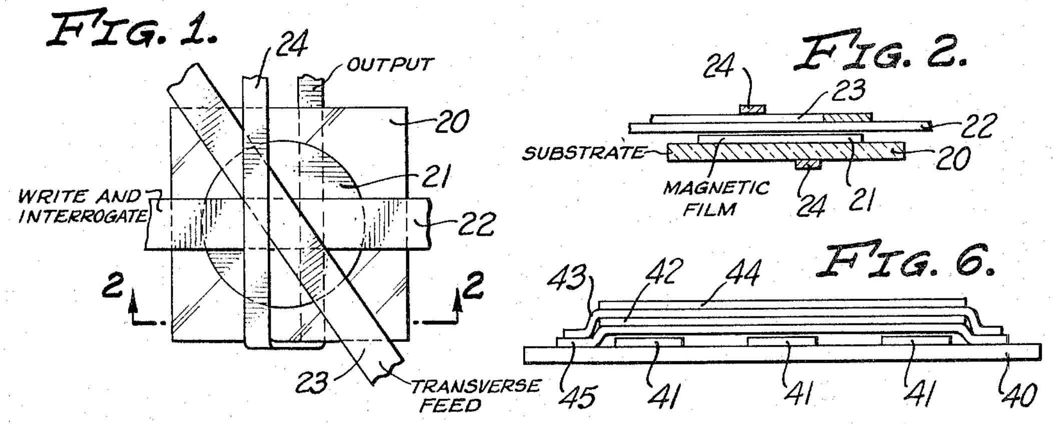
FIG. 1 is a plan view of a single memory element embodying the invention.
FIG. 2 is a sectional view taken along the line 2—2 of FIG. 1.
FIG. 6 is a side elevation of a memory system incorporating a plurality of memory elements.

*FIGS. 1 and 2*

The memory element of FIG. 1 and FIG. 2 includes a substrate 20 of ceramic, glass or other suitable material, with a spot or zone 21 of magnetic material thereon. Any of the conventional techniques may be used in preparing the magnetic material and applying it to the substrate. Typically the magnetic material will be a nickel-iron alloy applied by vapor deposition through a mask to form a film of the desired shape on the substrate. The particular size and shape are not critical. The film spots for the examples to be given herein were formed of an alloy of eighteen percent nickel and eighty-two percent iron deposited in a three-millimeter diameter spot in a film about 1400 A. thick. Zones in a continuous film of magnetic material may be employed instead of individual spots and the term "spot" as used herein includes both individual zones and zones in a continuous film.

A write and interrogate conductor 22 is positioned over the spot 21. A transverse feed conductor 23 is positioned over the conductor 22 and disposed oblique thereto. An output conductor 24 is looped over the substrate and the other conductors.

Figure 3:
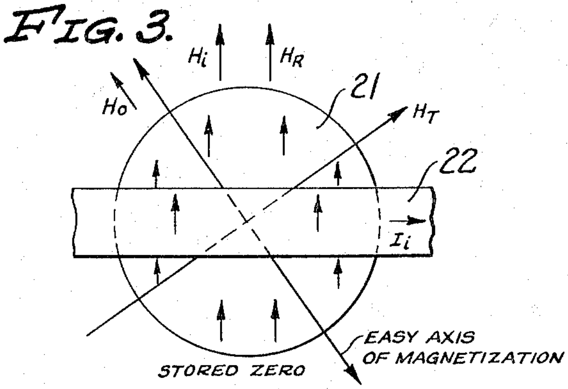
FIGS. 3 and 4 are diagrams illustrating the operation of the memory of FIG. 1.
Figure 4:
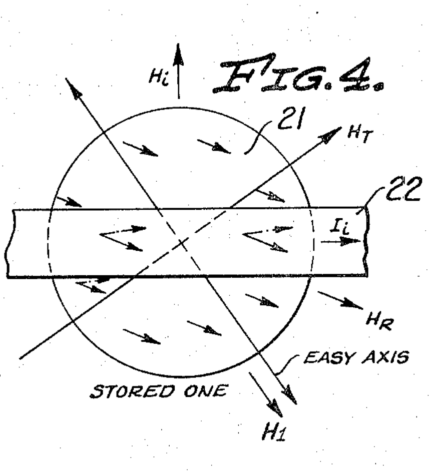

*FIGS. 3 and 4*

Next consider the diagrams of FIGS. 3 and 4. The spot 21 of magnetic material has an easy axis of magnetization which is oriented as indicated. For the purpose of this discussion, a magnetic field in the direction $H_0$ (FIG. 3) is defined as a stored binary zero and a field in the direction $H_1$ (FIG. 4) is defined as a stored one. Information may be written or stored in the magnetic material by reversing the direction of the magnetic flux by various known techniques. A preferred method of writing will be described below.

A transverse magnetic field $H_T$ in the magnetic material which is oriented substantially perpendicular to the easy axis of magnetization may be produced by providing a current in the conductor 23 which is aligned with the easy axis of the material. If the transverse field is supplied in combination with the residual field $H_0$ due to a stored ZERO, a resultant magnetization $H_R$ (FIG. 3) will exist in the magnetic material. The orientation of the resultant field vector $H_R$ is determined by the magnitude of the current in the conductor 23. The polarity of the transverse field $H_T$ is maintained constant so that the resultant field will have an orientation as shown by the arrows in FIG. 3 when a ZERO has been stored and a different orientation as shown by the solid arrows in FIG. 4 when a ONE has been stored.

Interrogate and write conductor 22 is positioned across the spot 21 oblique to the easy axis of magnetization and ordinarily perpendicular to one position of the resultant field vector $H_R$. In the example of FIGS. 3 and 4, the conductor 22 is positioned perpendicular to the resultant field $H_R$ produced by the transverse field $H_T$ and the field $H_0$ due to a stored ZERO. An interrogate current $I_i$ in the conductor 22 will produce a magnetic field in alignment with the resultant field $H_R$. Output conductor 24 is used to produce the output of the memory. Voltages are induced in conductor 24 by field rotation in the magnetic film. For a stored zero, the interrogate pulse in the conductor 22 will produce no field rotation and hence no output will appear on conductor 24.

Now consider the stored ONE condition of FIG. 4. The interrogation current $I_i$ produces an interrogation field $H_i$ which rotates the magnetic field in the magnetic material from the alignment shown by the solid arrows to the alignment shown by the broken arrows. This field rotation generates a voltage in the output conductor 24, thereby indicating a stored ONE.

The interrogation current is controlled so that flux field rotation occurs only in a portion of the magnetic material. This is best achieved by making the conductor 22 a thin ribbon which lies directly on the magnetic material. Then the magnitude of the interrogate current can be regulated so as to affect only the flux field in the magnetic material directly under the conductor. In its preferred form, the conductor 22 covers about the central third of the spot. With the three-millimeter diameter spots mentioned above, a one-millimeter wide strip is used as the conductor.

On termination of the interrogation pulse, the flux field which had been rotated by the interrogation pulse returns to alignment with the resultant field $H_R$, leaving the stored information undisturbed and thus permitting nondestructive reading of the memory. It appears that the mechanism of flux action in the magnetic material which permits the nondestructive reading is as follows. With the application of the interrogation pulse, the magnetic material in the central zone underlying the interrogation conductor is rotated as a whole domain. At this time, the film is divided into three domains, the two domains on either side of the central zone and the domain in the central zone adjacent the interrogation conductor. The rotated domain adjacent the interrogation conductor is created by the combination of the $H_i$ and $H_R$ fields, which causes the magnetization vector of the domain to rotate to reach its minimum energy state. When the $H_i$ field terminates, the two unrotated domains grow at the detriment of the rotated domain and the film is restored as a single saturated domain oriented along the $H_R$ field vector.

Conductor 22 may also be used for writing information into the magnetic material. Alternatively, a separate conductor may be used, the only requirement being that the writing current produce a magnetic field which will switch the residual field to the desired polarity along the easy axis.

*FIG. 5*

Figure 5:
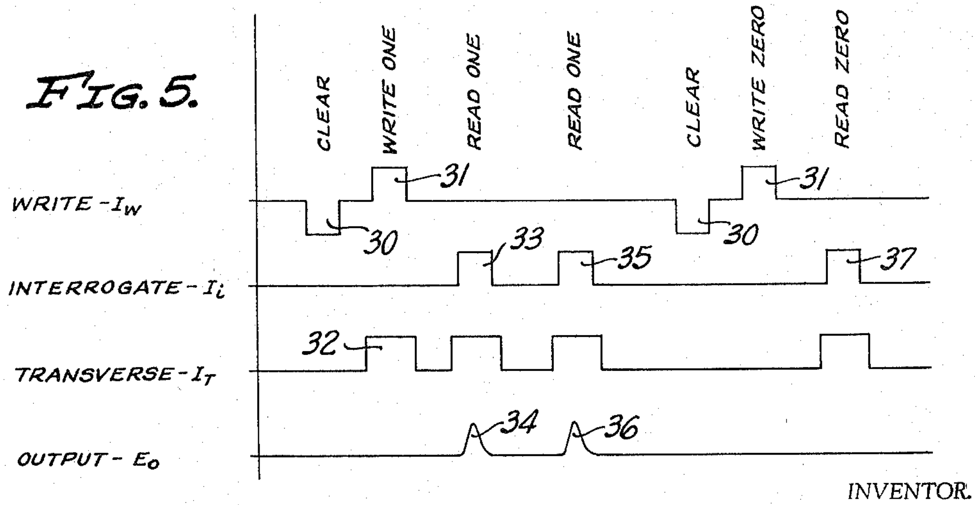
FIG. 5 is a timing diagram for a writing and reading operation.
Figure 7:
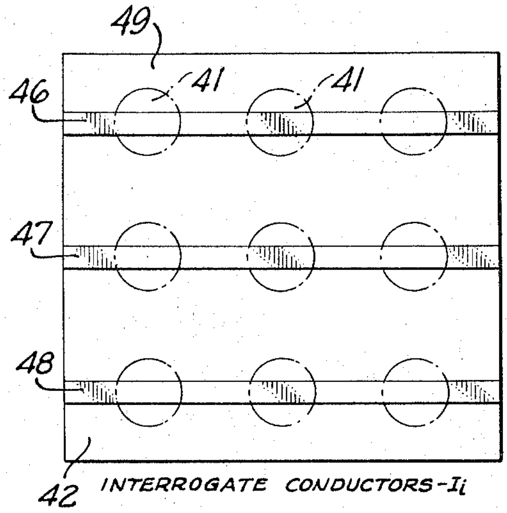
FIGS. 7, 8, 9 and 10 are plan views of various components of the system of FIG. 6.
Figure 8:
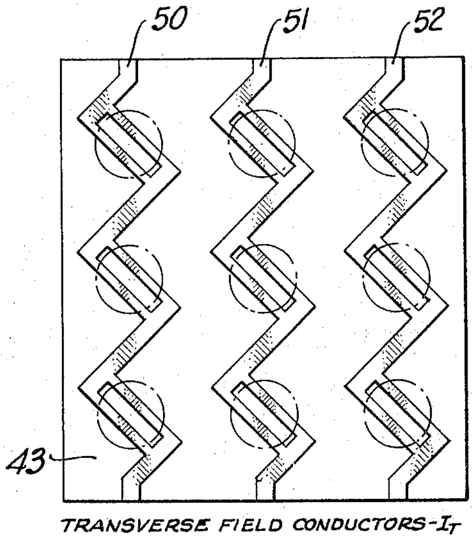
Figure 9:
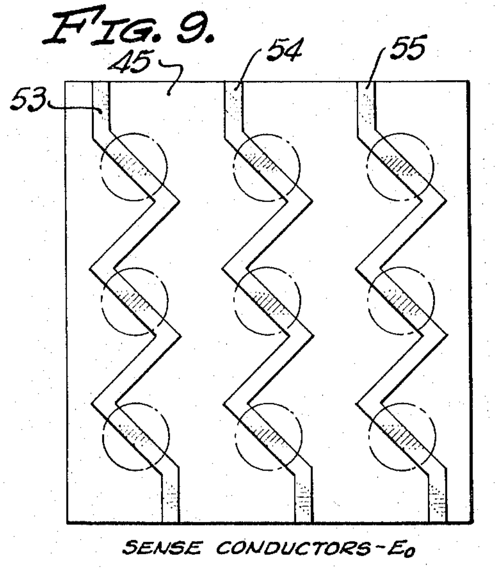
Figure 10:
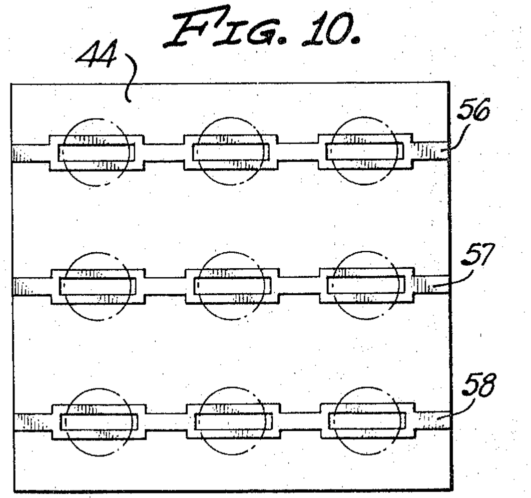

A preferred method of arrangement for coincident current writing is illustrated in FIG. 5. The write current $I_w$ and the interrogate current $I_i$ are supplied to conductor 22. The transverse current $I_T$ is supplied to conductor 23 to produce the transverse field which is also used in the writing operation. The output voltage $E_0$ appears on the output conductor 24. Writing is carried out with successive pulses 30, 31 of opposite polarities.

The first pulse 30 on conductor 22 produces a vertical downward field in spot 21. When the pulse terminates the orientation of the downward field changes to that of the easy axis in the direction $H_1$. Pulse 30 serves as a clearing pulse and always switches the magnetization in the material to the stored ONE condition, $H_1$. The second pulse 31 of the opposite polarity will, be a similar analysis, switch the residual flux to the stored ZERO condition except when there is a transverse field present.

When the write pulse 31 occurs during a transverse field as is produced by pulse 32 along conductor 23, the resulting field will be insufficient to reverse the stored ONE to a stored ZERO. Thus the condition of the residual field along the easy axis is not disturbed, and the material remains in the stored ONE condition.

With the stored ONE condition, an interrogation pulse 33 on the conductor 22 results in an output pulse 34 on the output conductor 24. This is a nondestructive reading operation, as indicated by the fact that another interrogation pulse 35 following the interrogation pulse 33 also produces an output 36. With a stored ZERO, an interrogation pulse 37 produces no output on the output conductor.

In the mode of operation illustrated in FIG. 5, the transverse field is produced by current pulses coincident with the interrogation pulses and with the write ONE pulse. Alternatively, the transverse field could be maintained on at all times with an additional field component utilized for writing.

The writing times may be less than 0.25 microsecond, the reading times less than 40 nanaseconds, and the combined read-write sequence less than 0.3 microseconds. The writing currents and the transverse field current are selected to provide the desired field rotations. Typical examples are $I_w$ 0.150 ampere and $I_T$ 0.2 ampere. The interrogation current pulse is selected to produce domain rotation only in the central portion of the spot. For the specific example given above, an interrogation pulse of twenty nanaseconds and 150 milliamperes was utilized.

*FIGS. 6–10*

A memory system in the form of a matrix of data bits is shown in FIGS. 6–10. A substrate 40 has a plurality of spots 41 of magnetic material arranged thereon in a matrix. An interrogate conductor sheet 42, a transverse field conductor sheet 43, a write conductor sheet 44, and a sense conductor sheet 45 are positioned over the film spots in layers. The particular arrangement of the conductor sheets is not critical but it is preferred in order to place the sense conductor sheet directly on the magnetic material.

In their preferred form, each conductor sheet comprises a plastic film having a metal foil adhered thereto, with the metal foil etched to provide the desired conductor pattern. Interrogate conductors 46, 47, 48 (FIG. 7) are carried on a plastic film 49 to form the sheet 42, with each interrogate conductor disposed to overlie a row of three spots of the 3 x 3 matrix. The positions of the spots 41 are indicated in phantom lines on the drawing. The transverse field sheet 43 (FIG. 8) is formed similarly with conductors 50, 51, 52, each arranged to overlie three spots in a column. That portion of each conductor which passes over the spot is formed in two spaced parallel paths to produce a uniform field in the magnetic material with a minimum current in the conductor.

The sense conductor sheet 45 (FIG. 9) is formed similarly with conductors 53, 54, 55. The interrogate conductors may also be used for the write currents but it is preferred to utilize separate conductors to simplify the current control switching circuitry. The write conductor sheet 44 (FIG. 10) is formed similarly to the interrogate conductor sheet 42, with conductors 56, 57, 58 thereon. It is preferred to form that portion of a write conductor directly overlying the magnetic material in two spaced parallel paths, as in the transverse field sheets 43, for maximum efficiency.

With the memory system of FIGS. 6–10, information may be written into any selected spot or zone of magnetic material by utilizing the write and transverse field conductors which intersect at the selected spot. Similarly, information may be read from any spot by utilizing the interrogate and sense conductors which intersect at the selected spot.

The memory element of the invention provides a magnetic memory system utilizing a single spot or zone of magnetic material for each data bit and provides extremely high write and read rates with nondestructive readout.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. In a memory element, the combination of:

a thin film of magnetic material having an easy axis of magnetization and two possible oppositely-oriented states of magnetization along said easy axis;

means for generating a transverse magnetic field in said film oriented substantially orthogonally to said easy axis, said transverse magnetic field having a magnitude which in combination with either of said states of magnetization produces a resultant field in said film having an orientation intermediate said easy axis and the axis of said transverse magnetic field;

means for generating simultaneously with said transverse field a magnetic field in said film oriented obliquely to said easy axis, said field having a magnitude which in combination with one of said states of magnetization produces rotation of the magnetic field in said film in a central portion thereof only so as to provide a first domain of one orientation in said portion while leaving the remaining domains of said film unaffected, whereby said remaining domains will grow upon termination of said field to eliminate said first domain; and means for generating a voltage which varies as a function of magnetic field change in said film.

2. In a binary memory element, the combination of:

a thin film of magnetic material having an easy axis of magnetization and two possible oppositely-oriented states of magnetization along said easy axis which represent a binary ZERO and ONE, respectively;

a straight conductor overlying said film, said conductor being oriented obliquely with said easy axis;

means for generating a transverse magnetic field oriented substantially orthogonally to said easy axis, said transverse field having a magnitude which, when said film is in one of said states, produces a resultant field which is oriented substantially orthogonally to said conductor;

means for supplying a current pulse to said conductor while said magnetic field is being generated, said pulse having a magnitude which, when said film is in the other of said states, produces rotation of the magnetic field only in a central portion of said film under said conductor so as to provide a first domain of one orientation in said portion while leaving the remaining domains of said film unaffected, whereby said remaining domains will grow upon termination of said pulse to eliminate said first domain; and means for generating an output voltage which varies as a function of magnetic field change in said film, whereby said current pulse will produce substantially no field rotation and hence no output voltage when said film is in said one of said states.

3. In a binary memory element, the combination of:

a thin film of magnetic material having an easy axis of magnetization and two possible oppositely-oriented states of magnetization along said easy axis which represent a binary ZERO and ONE, respectively;

means for generating a transverse magnetic field oriented substantially orthogonally to said easy axis, said transverse magnetic field having a magnitude which in combination with either of said states of magnetization produces a resultant field in said film having an orientation intermediate said easy axis and the axis of said transverse magnetic field;

a straight conductor overlying a central zone of said film, said conductor being oriented obliquely to said easy axis;

means for supplying to said conductor while said transverse magnetic field is being generated, a current pulse which has a magnitude which, when said film is in one of said states, produces rotation of the magnetic field in said central zone only to provide a first domain of one orientation in said central zone while leaving the remaining domains in the rest of said film unaffected, whereby said remaining domains will grow upon termination of said pulse to eliminate said first domain; and means for generating a voltage which varies as a function of the magnetic field change in said film.

4. In a memory element, the combination of:

a thin film of magnetic material having an easy axis of magneization and two possible oppositely-oriented states of magnetization along said easy axis;

a first conductor overlying said film along said easy axis;

means for supplying a current to said first conductor of a magnitude which in combination with either of said states of magnetization produces a resultant magnetic field in said film which is oriented obliquely to said easy axis;

a second conductor overlying said film, said second conductor being oriented obliquely to said easy axis;

means for supplying a current pulse to said second conductor while said current is supplied to said first conductor, said pulse having a magnitude which, when said film is in one of said states, produces rotation of the magnetic field in a central portion only of said film under said conductor so as to provide a first domain of one orientation at said portion while leaving the remaining domains of said film unaffected, whereby said remaining domains will grow upon termination of said pulse to eleminate said first domain; and a third conductor crossing over said film and oriented obliquely to said easy axis for induction of a voltage therein which varies as a function of magnetic field change in said film.

5. In a memory element, the combination of:

a thin film of magnetic material having an easy axis of magnetization, and two possible oppositely-oriented states of magnetization along said easy axis;

means for generating a transverse magnetic field oriented substantially orthogonally to said easy axis, said transverse field having a magnitude which in combination with either of said states of magnetization produces a resultant field in said film which is oriented intermediate said easy axis and said transverse magnetic field axis;

a conductor overlying said film, said conductor being oriented obliquely to said easy axis;

means for supplying a current pulse to said conductor during the generation of said transverse field, said pulse having a magnitude which produces rotation of the magnetic field in a central transverse portion only of said film under said conductor so as to provide a first domain of one orientation in said portion while leaving the remaining domains of said film unaffected, whereby said remaining domains will grow upon termination of said pulse to eliminate said first domain;

and a conductor overlying said film and oriented obliquely to said easy axis for generating a voltage which varies as a function of the magnetic field change in said film.

6. In a memory element, the combination of:

a thin film of magnetic material having an easy axis of magnetization and two possible oppositely-oriented states of magnetization along said easy axis which represent a binary ZERO and ONE, respectively;

means for sequentially generating first and second magnetic flux pulses of opposite polarity in said film, said pulses being oriented obliquely to said easy axis and having a magnitude to set said film in opposite states of magnetization sequentially;

means for selectively generating a first transverse magnetic field oriented substantially orthogonally to said easy axis, said transverse field having a duration and timing such that said second pulse occurs during said transverse field, said transverse field having a magnitude which prevents the flux switching which would otherwise be produced by said second flux pulse;

means for generating a second transverse magnetic field substantially orthogonally to said easy axis, said second transverse field having a magnitude which in combination with either of said states of magnetization produces a resultant field in said film which is oriented intermediate said easy axis and said transverse field axis;

a straight conductor overlying said film at an oblique angle with said easy axis;

means for generating during said transverse magnetic field a current pulse in said conductor of a magnitude which produces rotation of the magnetic field in said film in a central transverse portion only of said film under said conductor so as to provide a first domain of one orientation in said portion while leaving the remaining domains of said film unaffected, whereby said remaining domains will grow upon termination of said current pulse to eliminate said first domain; and means for generating a voltage which varies as a function of the magnetic field change in said film during said current pulse, thereby to read information from said film.

7. In a nondestructive readout memory system, the combination of:

a substrate;

a plurality of spots of magnetic material disposed in a matrix of rows and columns in film form on said substrate, said spots having parallel easy axes of magnetization, each of said spots having two possible oppositely-oriented states of magnetization along said easy axes;

means for generating in one of said columns of spots a transverse magnetic field oriented substantially orthogonally to said easy axes, said transverse field having a magnitude which in combination with either of said states of magnetization produces a resultant field in each of said film spots which is oriented obliquely to the easy axis thereof;

a plurality of parallel interrogate conductors, each interrogate conductor overlying one of said rows of spots, said spots being oriented such that the easy axes thereof are oblique to said conductors;

means for supplying during the generation of said transverse field a current pulse to one of said interrogate conductors of a magnitude which produces a rotation of the magnetic field of an underlying film spot subject to said transverse field in a central transverse portion only of said spot so as to provide a first domain of one orientation in said portion while leaving the remaining domains of said spot unaffected, whereby said remaining domains will grow upon termination of said pulse to eliminate said first domain; and a plurality of parallel sense conductors, with a sense conductor overlying each column of film spots for induction of a voltage therein which varies as a function of magnetic field change in the underlying film spots.

8. The system of claim 7 wherein said plurality of interrogate conductors comprises a flexible plastic sheet having strips of metal foil adhered thereto in the pattern of said conductors, said sheet and substrate being assembled in layers.

9. In a nondestructive readout memory system, the combination of:

a substrate;

a plurality of spots of magnetic material form disposed in film form in a matrix of rows and columns on said substrate, said film spots having parallel easy axes of magnetization, each of said spots having two possible opposed states of magnetization along said easy axes;

means for setting said film spots selectively into preselected states of magnetization so as to write information into said film spots;

means for generating in one of said columns of film spots a transverse magnetic field oriented substantially orthogonally to said easy axes, said transverse field having a magnitude which in combination with either of said states of magnetization produces a resultant field in each of said film spots of said column which is oriented oblique to the easy axis thereof;

a plurality of parallel interrogate conductors, each interrogate conductor overlying one of said rows of film spots, said spots being oriented such that the easy axes thereof oblique to said conductors;

means for supplying during the generation of said transverse magnetic field a current pulse in one of said interrogate conductors of a magnitude which produces a rotation of the magnetic field of an underlying film spot subject to said transverse magnetic field in a central transverse portion only of said spot so as to provide a first domain of one orientation in said portion while leaving the remaining domains of said spot unaffected, whereby said remaining domains will grow upon termination of said pulse to eliminate said first domain; and a plurality of parallel sense conductors, with a sense conductor crossing over each column of film spots for induction of a voltage therein which varies as a function of magnetic field change in the underlying film spots.

10. In a nondestructive readout memory system, the combination of:

a substrate;

a plurality of spots of magnetic material disposed in film form in a matrix of rows and columns on said substrate, said film spots having parallel easy axes of magnetization, each of said spots having two possible oppositely-oriented states of magnetization along the easy axis thereof;

a plurality of parallel write conductors, each write conductor overlying one of said rows of said film spots;

a plurality of parallel transverse field conductors, each transverse field conductor overlying one column of film spots parallel to the easy axis of each underlying film spot;

means for supplying sequentially first and second write pulses of opposite polarity to one of said write conductors, said pulses having a magnitude to set the underlying spots in opposite states of magnetization sequentially;

means for selectively supplying a transverse field pulse of predetermined polarity to one of said transverse field conductors, said pulse having a timing and duration such that said second write pulse occurs during said transverse field pulse, said transverse field pulse having a magnitude which in combination with either of said states of magnetization produces a resultant field in said spots which is oriented oblique to the easy axis of said spots;

a plurality of parallel interrogate conductors, each conductor overlying one of said film spots in a direction oblique to the easy axis thereof;

means for supplying a read pulse to each of said transverse field conductors, said pulse having a magnitude which in combination with one of said states of magnetization produces a resultant field in each film spot which is oriented oblique to the easy axis thereof;

means for supplying a current pulse to selected interrogate conductors during said read pulse, said current pulse having a magnitude which produces rotation of the magnetic field in an underlying film spot only in a central portion thereof so as to provide a first domain of one orientation in said portion while leaving the remaining domains of said film spot unaffected, whereby said remaining domains will grow upon termination of said pulse to eliminate said first domain; and a plurality of parallel sense conductors, each sense conductor overlying one column of film spots, whereby a voltage will be induced in said sense conductors which varies as a function of magnetic field change in the underlying film spots.

11. The system of claim 10 wherein:

said plurality of write conductors comprises a first flexible plastic sheet having strips of metal foil adhered thereto in the pattern of said write conductors;

said plurality of transverse field conductors comprises a second flexible plastic sheet having strips of metal foil adhered thereto in the pattern of said transverse field conductors;

said plurality of interrogation conductors comprises a third flexible plastic sheet having strips of metal foil adhered thereto in the pattern of said interrogation conductors;

and said plurality of sense conductors comprises a fourth flexible plastic sheet having strips of metal foil adhered thereto in the pattern of said sense conductors, said sheet and substrate being assembled in layers.

References Cited by the Examiner

UNITED STATES PATENTS

| | | | |
|---|---|---|---|
| 3,030,612 | 4/1962 | Rubens et al. | 340—174 |
| 3,048,829 | 8/1962 | Bradley | 340—174 |
| 3,058,099 | 10/1962 | Williams | 340—174 |
| 3,070,783 | 12/1962 | Pohm | 340—174 |
| 3,154,765 | 10/1964 | Alexander | 340—174 |
| 3,154,766 | 10/1964 | Bittmann | 340—174 |
| 3,174,138 | 3/1965 | Matcovich | 340—174 |
| 3,223,985 | 12/1965 | Bittmann | 340—174 |

FOREIGN PATENTS

| | | |
|---|---|---|
| 845,605 | 8/1960 | Great Britain. |

OTHER REFERENCES

Journal of Applied Physics, volume 29, No. 3, pages 264–273, March 1958.

Instruments and Control Systems, March 1961, pages 451 to 454.

BERNARD KONICK, *Primary Examiner.*

IRVING SRAGOW, *Examiner.*

M. S. GITTES, R. R. HUBBARD, *Assistant Examiners.*